DE WITT CLINTON.
SPRING WHEEL.
APPLICATION FILED FEB. 5, 1917

1,258,534.

Patented Mar. 5, 1918.
2 SHEETS—SHEET 1.

Witnesses

DeWitt Clinton, Inventor
by C. A. Snow & Co.
Attorneys

DE WITT CLINTON.
SPRING WHEEL.
APPLICATION FILED FEB. 5, 1917.

1,258,534.

Patented Mar. 5, 1918.
2 SHEETS—SHEET 2.

Witnesses

De Witt Clinton, Inventor by C. A. Snow & Co.
Attorneys

UNITED STATES PATENT OFFICE.

DE WITT CLINTON, OF MYRTLE POINT, OREGON.

SPRING-WHEEL.

1,258,534. Specification of Letters Patent. Patented Mar. 5, 1918.

Application filed February 5, 1917. Serial No. 146,757.

*To all whom it may concern:*

Be it known that I, DE WITT CLINTON, a citizen of the United States, residing at Myrtle Point, in the county of Coos and State of Oregon, have invented new and useful Spring-Wheels, of which the following is a specification.

The device forming the subject matter of this application is a spring wheel, and one object of the invention is to provide a means whereby pneumatic tires and other like elements subject to puncture and deterioration may be dispensed with.

Another object of the invention is to improve the tire construction and so to place the retainers which hold the outer ends of the springs, on one of the tire sections, that said retainers will act as guides for the other of the tire sections, when the last specified tire section is slid toward that tire section wherewith the retainers are assembled.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1:
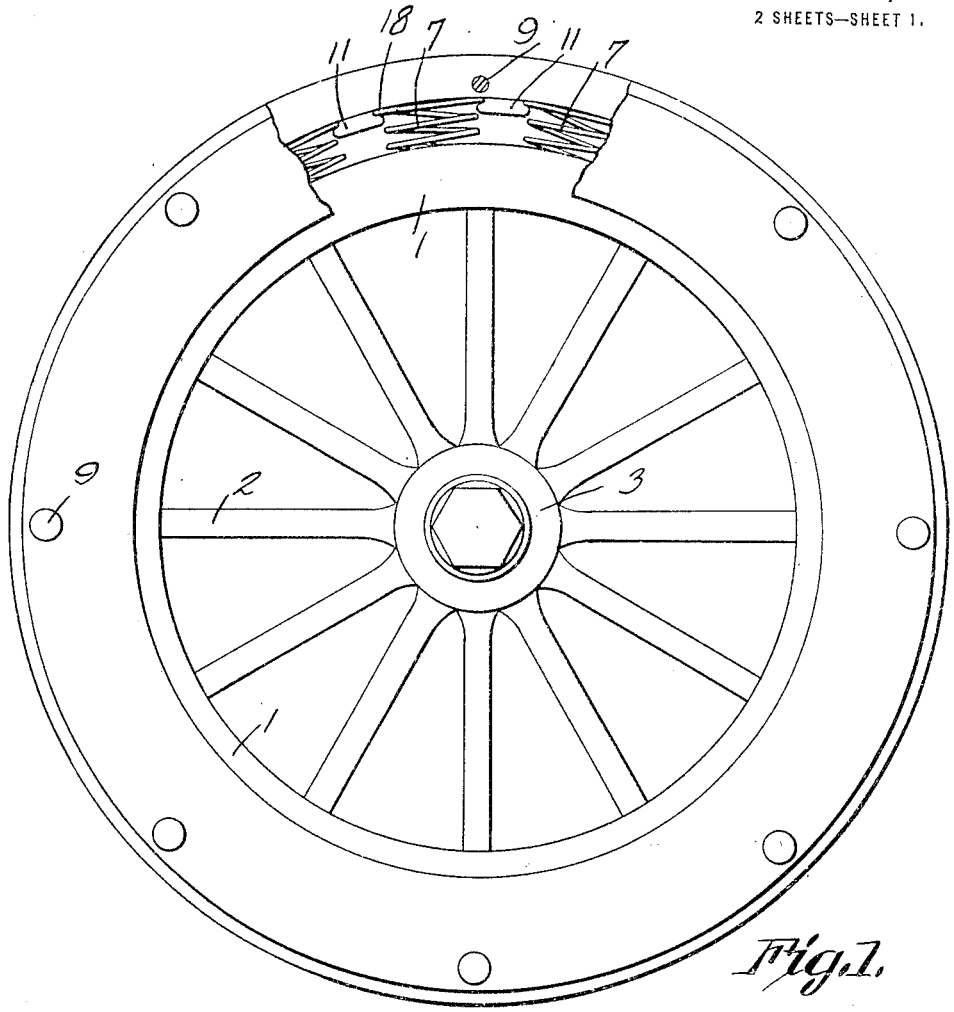
Figure 1 shows in side elevation, a wheel constructed in accordance with the present invention, parts being broken away.

In carrying out the present invention there is provided a main rim 1 which may be connected by means of spokes 2 with a hub 3. The spokes 2 may be replaced by any other suitable means for connecting the main rim with the hub. The main rim 1 has side flanges 4, as clearly shown in Fig. 4, the side flanges 4 defining a circumscribing groove in the rim. The groove is denoted by the reference character 5.

Figure 2:
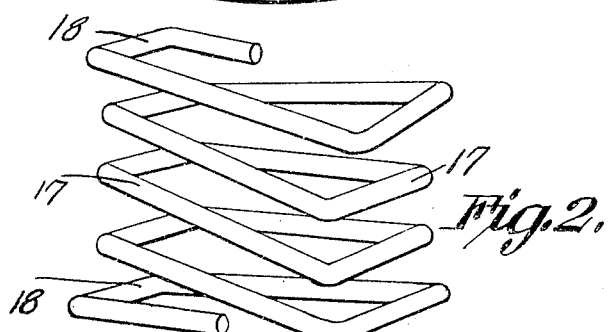
Fig. 2 is a perspective view showing one of the springs employed in the wheel.
Figure 3:
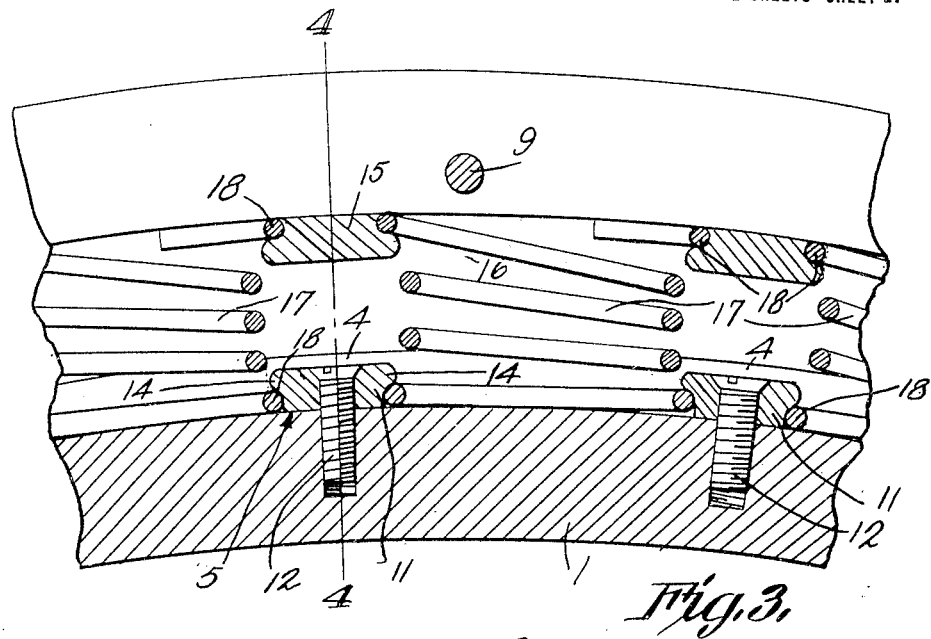
Fig. 3 is a partial longitudinal section taken in the medial plane of the wheel.

The numeral 6 denotes generally, a tire, which preferably is made of some metal, steel being preferred. The tire 6 includes two circumferentially continuous sections 7 which abut adjacent the medial plane of the wheel, as shown at 8. The sections 7 of the tire 6 are held together by transverse securing elements 9. The constituent sections 7 of the tire 6 are equipped with side flanges 10, slidably overlapped on the outer faces of the side flanges 4 of the main rim 1. Retainers 11 are applied to the main rim 1 within the contour of the groove 5 and are held to the main rim 1 by means of securing elements 12. The retainers 11 are equipped with overhanging end flanges 14. Retainers 15 are applied to the inner curve of the tire 6 and embody end flanges 16. Disposed between the main rim 1 and the tire 6 are springs 17, one of which is shown in Fig. 2. The springs 17 preferably are of helical form and embody a plurality of rectangular convolutions. The terminal convolutions 18 of the springs 17 are engaged, respectively, by the flanges 16 of the retainers 15, and by the flanges 14 of the retainers 7.

Figure 4:
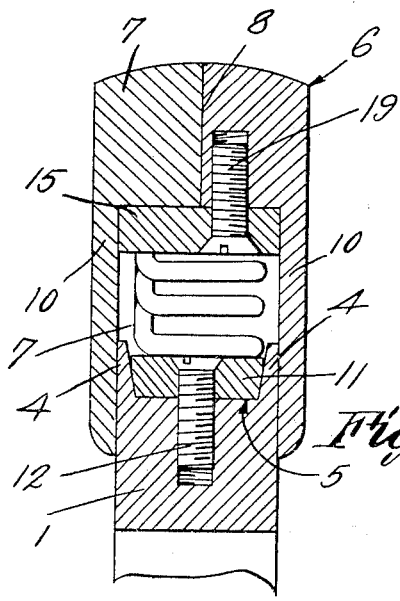
Fig. 4 is a cross section taken approximately on the line 4—4 of Fig. 3.

Especial attention is directed to the securing elements 19 which unite the retainers 15 with one of the constituent sections 7 of the tire 6, to one side of the median plane 8 of the wheel, as shown clearly in Fig. 4. Owing to this construction, when the securing elements 9 are removed, the left hand section 7 may be slid toward the right hand section, in Fig. 4, until the sections abut along the line 8. Under such circumstances, those portions of the retainers 15 which project to the left of the plane of abutment 8 in Fig. 4, act as guides, directing movement of the left hand section of the tire toward the right hand section, when the sections are advanced to abut along the line 8.

The device hereinbefore described is so constructed that there are no exposed delicate parts likely to puncture or deterioration, and the structure will be found of peculiar utility when called upon to perform heavy duty of the kind imposed on devices of this type in heavy vehicles, such as motor trucks and the like.

The terminal convolutions of the springs 17 are slightly larger than the remaining convolutions of the springs. The terminal convolutions of the springs, therefore, may be engaged by the flanges 14 of the retainers 11 and by the flanges 16 of the retainers 15, the intermediate convolutions of the springs yielding under compression, without striking the flanges of the respective retainers.

Having thus described the invention, what is claimed is:—

1. In a spring wheel, a tire having side flanges; a rim having side flanges; helical springs engaged terminally with the tire and the rim; inner and outer retainers disposed between the springs and having flanges overhanging the terminal convolutions of the springs; a single securing element uniting each outer retainer with the tire, and a single securing element uniting each inner retainer with the rim, the ends of the outer retainers engaging the flanges of the tire and the ends of the inner retainers engaging the flanges of the rim to prevent the retainers from rotating on their respective securing elements and disengaging the flanges of the retainers from the terminal convolutions of the springs, the intermediate convolutions of the springs being of smaller diameter than the terminal convolutions thereof to clear the flanges of adjoining retainers when the springs are compressed.

2. In a spring wheel, a tire made up of laterally separable sections which abut adjacent the median plane of the wheel, each section of the tire having an inwardly porjecting flange; a rim slidable between the flanges; springs located between the tire and the rim; means for attaching the inner ends of the springs to the rim; retainers engaging the outer ends of the springs; and means for securing the retainers to one section of the tire, the retainers projecting laterally beyond said section of the tire within the contour of the other section, to serve as guides therefor, when the sections are placed together; and securing devices uniting the sections of the tire.

In testimony that I claim the foregoing as my own, I have hereto affixed my signature in the presence of two witnesses.

DE WITT CLINTON.

Witnesses:
CARL L. DAVIS,
E. C. ROBERTS.